US012537252B2

(12) United States Patent
Hwang et al.

(10) Patent No.: US 12,537,252 B2
(45) Date of Patent: Jan. 27, 2026

(54) BATTERY PACK

(71) Applicant: SK On Co., Ltd., Seoul (KR)

(72) Inventors: Jae Il Hwang, Daejeon (KR); Min Song Kang, Daejeon (KR); Bon Seok Ku, Daejeon (KR); Jun Hee Jung, Daejeon (KR); Sei Hoon Cho, Daejeon (KR); Jin Su Han, Daejeon (KR)

(73) Assignee: SK ON CO., LTD., Seoul (KR)

( * ) Notice: Subject to any disclaimer, the term of this patent is extended or adjusted under 35 U.S.C. 154(b) by 703 days.

(21) Appl. No.: 17/742,073

(22) Filed: May 11, 2022

(65) Prior Publication Data

US 2022/0367952 A1 Nov. 17, 2022

(30) Foreign Application Priority Data

May 12, 2021 (KR) .................. 10-2021-0061476

(51) Int. Cl.
*H01M 50/204* (2021.01)
*H01M 50/271* (2021.01)
*H01M 50/291* (2021.01)
*H01M 50/367* (2021.01)
*H01M 50/502* (2021.01)

(52) U.S. Cl.
CPC ....... *H01M 50/204* (2021.01); *H01M 50/271* (2021.01); *H01M 50/291* (2021.01); *H01M 50/367* (2021.01); *H01M 50/502* (2021.01)

(58) Field of Classification Search
CPC ............. H01M 50/204; H01M 50/502; H01M 50/291; H01M 50/271; H01M 50/367
See application file for complete search history.

(56) References Cited

U.S. PATENT DOCUMENTS

| 2012/0058382 A1 | 3/2012 | Carignan et al. |
| 2014/0322568 A1 | 10/2014 | Sakai et al. |
| 2020/0176739 A1 | 6/2020 | You et al. |

(Continued)

FOREIGN PATENT DOCUMENTS

| DE | 112017000545 T5 | 10/2018 |
| EP | 4064433 A1 | 9/2022 |

(Continued)

OTHER PUBLICATIONS

Partial European Search Report for European Patent Application No. 22172158.2, mailed Nov. 8, 2022 (15 pages).

(Continued)

*Primary Examiner* — Olatunji A Godo
(74) *Attorney, Agent, or Firm* — Perkins Coie LLP

(57) ABSTRACT

A battery pack includes a plurality of battery modules, a battery pack case engaged to hold the plurality of battery modules and structured to provide an accommodating space in which the plurality of battery modules are accommodated, wherein the battery pack case includes one or more reinforcing frames structured to partition the accommodating space into subspaces in which the plurality of battery modules are held, one or more protective covers respectively coupled to the one or more reinforcing frames to cover part of each battery module and part of each reinforcing frame, and one or more bus bars coupled to the one or more protective covers and structured to electrically connect the plurality of battery modules.

18 Claims, 6 Drawing Sheets

(56) References Cited

U.S. PATENT DOCUMENTS

2020/0381694 A1\* 12/2020 Rath .................. H01M 10/653
2021/0175586 A1   6/2021 Haruki et al.
2022/0285755 A1\* 9/2022 Chi .................... H01M 50/507

FOREIGN PATENT DOCUMENTS

KR   10-2014-0015252 A   2/2014
KR   10-2016-0041311 A   4/2016
KR   10-2020-0067587 A   6/2020

OTHER PUBLICATIONS

Extended European Search Report for European Patent Application No. 22172158.2, mailed Feb. 15, 2023 (13 pages).

\* cited by examiner

BATTERY PACK

CROSS-REFERENCE TO RELATED APPLICATION(S)

This patent document claims the priority and benefits of Korean Patent Application No. 10-2021-0061476 filed on May 12, 2021, the entire disclosure of which is incorporated herein by reference for all purposes.

TECHNICAL FIELD

The technology and implementations disclosed in this patent document generally relate to a battery pack.

BACKGROUND

The rapid growth of electric vehicles and energy storage systems has brought increasing demands for high energy density batteries. High-output battery packs using a non-aqueous electrolyte is an example of a high energy density battery. Such a high-output battery pack can achieve high capacity by connecting a plurality of battery modules in series or parallel in the battery pack, making it possible to operate electric vehicles and energy storage systems requiring high power.

SUMMARY

The technology disclosed in this patent document can be implemented in some embodiments to provide a battery pack that can reduce structural damage when a flame occurs inside of the battery pack.

The disclosed technology can also be implemented in some embodiments to optimize the manufacturing of the battery pack by simplifying a bus bar fastening process for electrically connecting terminals of neighboring battery modules.

According to an aspect of the present disclosure, a battery pack includes a plurality of battery modules, a battery pack case engaged to hold the plurality of battery modules and structured to provide an accommodating space in which the plurality of battery modules are accommodated, wherein the battery pack case includes one or more reinforcing frames structured to partition the accommodating space into subspaces in which the plurality of battery modules are held; one or more protective covers respectively coupled to the one or more reinforcing frames to cover part of each battery module and part of each reinforcing frame; and one or more bus bars coupled to the one or more protective covers and structured to electrically connect the plurality of battery.

Each protective cover may include a portion supported by neighboring battery modules associated with the protective cover, and at least a portion of the protective cover is disposed between a bus bar associated with the protective cover and of the neighboring battery modules.

The bus bar may be disposed on the protective cover, and both ends of the bus bar may be fastened to terminals of the plurality of battery modules through a terminal coupling portion disposed on the protective cover.

The protective cover may include an extended portion supported by at least two of the plurality of battery modules, and a blocking portion extending from the extended portion and disposed outside of the plurality of battery modules.

The blocking portion may have a bus bar insertion portion that includes a groove with an open top.

The bus bar may include a portion that is structured to be inserted into the bus bar insertion portion.

The plurality of battery modules may include a first battery module and a second battery module spaced apart from each other, the extended portion may include a first extended portion supported by the first battery module and a second extended portion supported by the second battery module, and the blocking portion may be disposed between the first battery module and the second battery module and connect the first extended portion and the second extended portion.

The blocking portion may include a barrier wall structured to block connection between a terminal of the first battery module and a terminal of the second battery module.

The blocking portion may include a first blocking portion disposed between the first battery module and the reinforcing frame, and a second blocking portion disposed between the second battery module and the reinforcing frame.

The protective cover may include a blocking portion extending in a longitudinal direction of the reinforcing frame and coupled to the reinforcing frame, and a terminal coupling portion accommodating the bus bar coupled to the terminals. The protective cover and the bus bar may be integrally formed.

The reinforcing frame may include a gas flow path disposed in the reinforcing frame, and a vent hole structured to direct gas generated from the battery module into the gas flow path.

The protective cover may comprise a blocking portion extending in a longitudinal direction of the reinforcing frame and coupled to the reinforcing frame; and a terminal coupling portion structured to support the bus bar coupled to the terminals.

The protective cover and the bus bar may be incorporated into a bus bar assembly.

The protective cover may include a guide portion disposed to surround ends of the bus bar coupled to the terminals.

The protective cover may include at least one of a resin material or a fiber composite material having heat resistance of 150° C. or higher.

According to an aspect of the present disclosure, a battery pack includes a plurality of battery modules including a first battery module and a second battery module, each of the first battery module and the second battery module including a plurality of terminals; a bus bar coupled to connect the first and second battery modules via the plurality of terminals provided on the first and second battery modules; and a protective cover structured to include one or more portions disposed between the bus bar and the first battery module and between the bus bar and the second battery module. The protective cover may include portions that extend to and are supported by the first and second battery modules, and includes a terminal coupling portion through which the bus bar is connected to the terminals of the first and second battery modules.

The protective cover may further comprise a blocking portion that extends into a space between the first and second battery modules to form a barrier between the first and second battery modules.

The blocking portion includes a first blocking portion and a second blocking portion structured to support the first extended portion and the second extended portion and create a groove between the first blocking portion and the second blocking portion.

The battery pack may comprise a battery pack case structured to hold the first and second battery modules and to support the bus bar and the protective cover; and a reinforcing frame engaged to the battery pack case and arranged between the first battery module and the second battery module, wherein the reinforcing frame is structured to be inserted into the groove between the first blocking portion and the second blocking portion of the protective cover.

According to an aspect of the present disclosure, a battery pack includes battery pack case including a bottom plate and side walls to form a battery holding space and reinforcing frames between two opposing sidewalls to divide battery holding space into segments and to reinforce a structure of the battery holding space; battery modules placed in the segments of the battery holding space of the batter pack case; protective covers engaged to the reinforcing frames, respectively, each protective cover structured to be electrically insulating; and a plurality of bus bars engaged to the protective covers to provide electrical connections to the battery modules for outputting stored electricity and for receiving input electrical power to recharge the battery modules.

Each reinforcing frame may be structured to include a hollow interior and a vent hole to allow for passage of a gas flow.

The plurality of busbars may include first bus bars for providing electrical connections between two battery modules on opposite sides of each reinforcing frame and second bus bars for providing electrical connections between two neighboring battery modules on a common side of each reinforcing frame.

BRIEF DESCRIPTION OF DRAWINGS

Certain aspects, features, and advantages of the disclosed technology are illustrated by the following detailed description with reference to the accompanying drawings.

DETAILED DESCRIPTION

Figure 1:
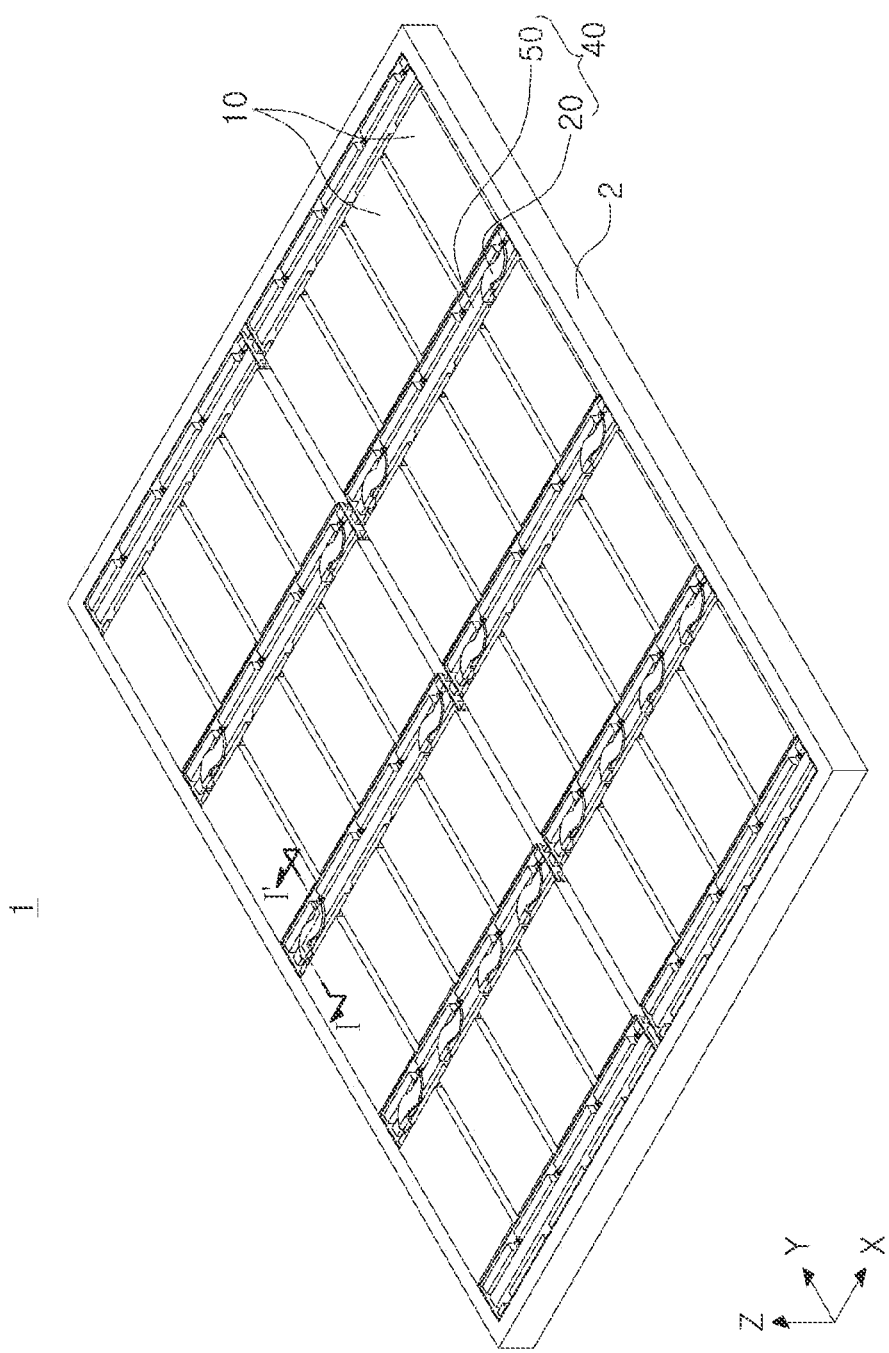
FIG. 1 is a perspective view schematically illustrating an example of a battery pack based on some embodiments of the disclosed technology.

The following detailed description is provided to assist the reader in gaining a comprehensive understanding of the methods, apparatuses, and/or systems described herein. It is to be understood that the disclosed technology can be implemented in various ways beyond the specifics of the methods, apparatuses, and/or systems described herein. The sequences of operations described herein are merely examples, and are not limited to those set forth herein.

The features described herein may be embodied in different forms, and are not to be construed as being limited to the examples described herein.

Herein, it is noted that use of the term "may" with respect to an embodiment or example, e.g., as to what an embodiment or example may include or implement, means that at least one embodiment or example exists in which such a feature is included or implemented while all examples and examples are not limited thereto.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other manners (for example, rotated 90 degrees or at other orientations), and the spatially relative terms used herein are to be interpreted accordingly.

The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The drawings may not be to scale, and the relative sizes, proportions, and depiction of elements in the drawings may be exaggerated for clarity, illustration, and convenience.

In some example implementations, battery modules in a battery pack are coupled only through bus bars, and thus, when a flame occurs in any one of the battery modules, unwanted flow may occur in the bus bar due to the flame, thereby causing the bus bar to come into contact with other surrounding structures, which can result in explosion of the battery pack.

Figure 2:
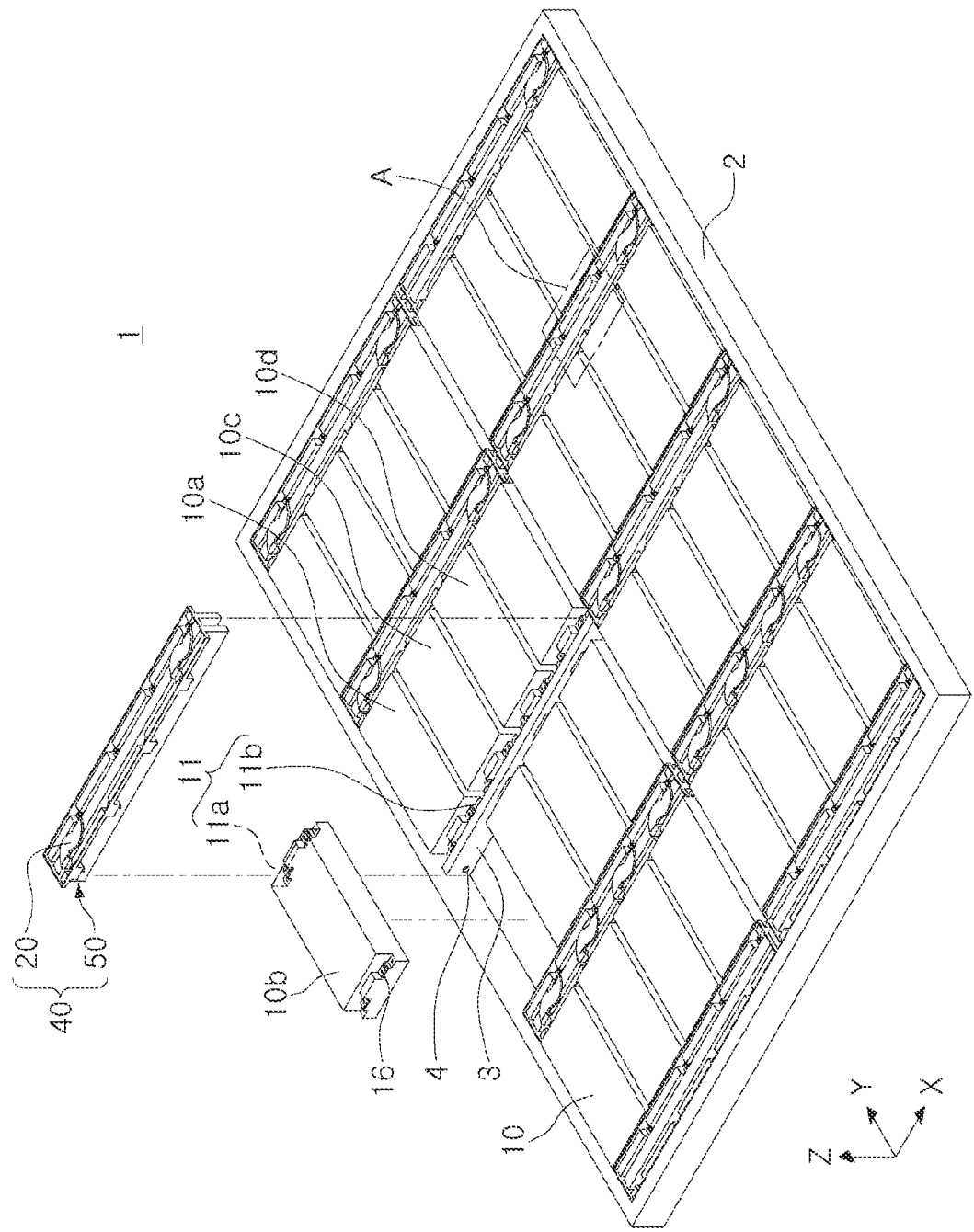
FIG. 2 is a partially exploded perspective view of FIG. 1.

FIG. 1 is a perspective view schematically illustrating an example of a battery pack based on some embodiments of the disclosed technology, and FIG. 2 is a partially exploded perspective view of FIG. 1.

Referring to FIGS. 1 to 2, a battery pack 1 based on some embodiments of the disclosed technology may include a battery pack case 2, a plurality of battery modules 10 disposed in and supported by the battery pack case 2, and a bus bar assembly 40 that includes a bus bar 20 to provide electrical connections for the battery modules 10 and a protective cover 50 for separating neighboring battery modules 10 to provide insulation and safety.

The battery pack case 2 may be structured to form and provide an accommodation space for holding the battery modules 10, the bus bar assembly 40 and other components.

Figure 4:
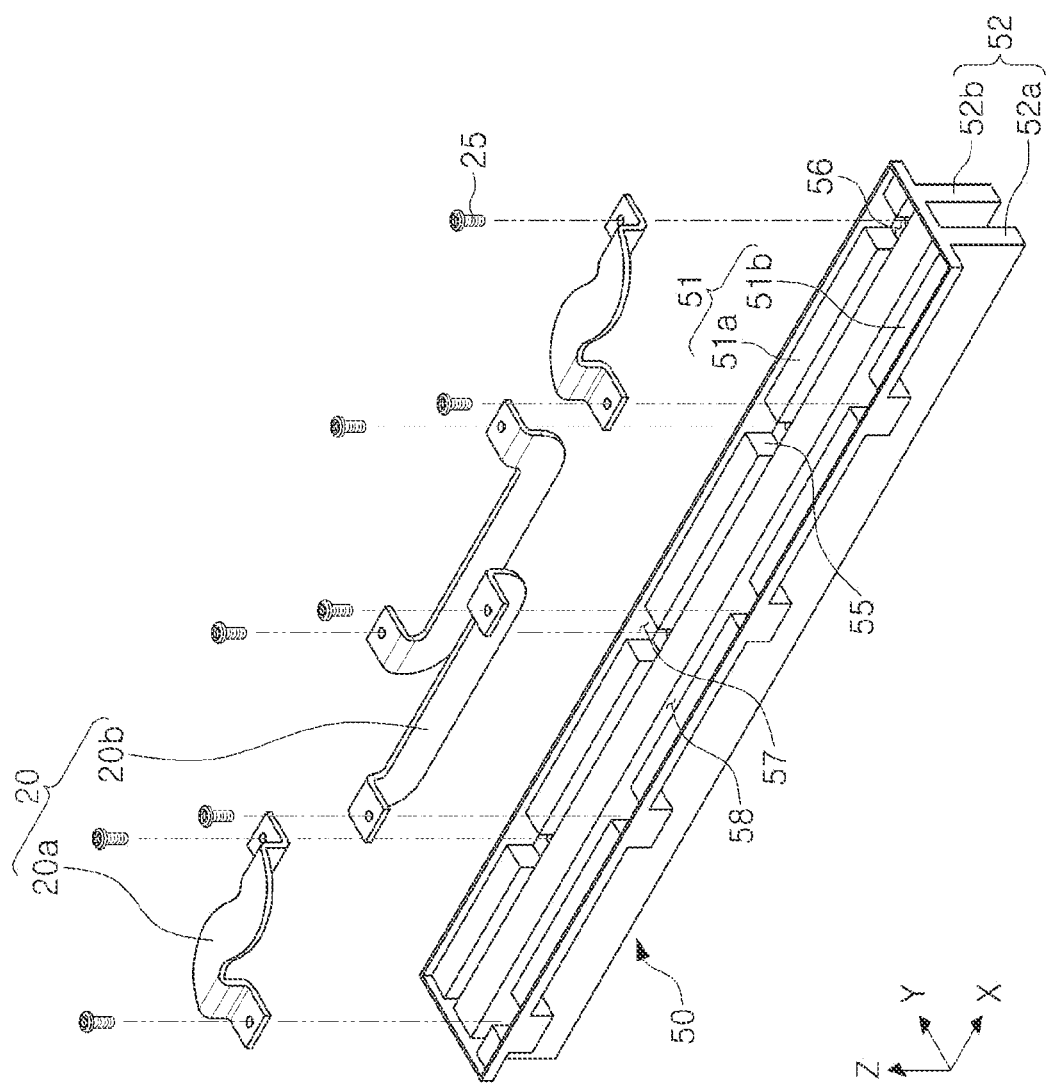
FIG. 4 is an exploded perspective view of FIG. 3.
Figure 5:
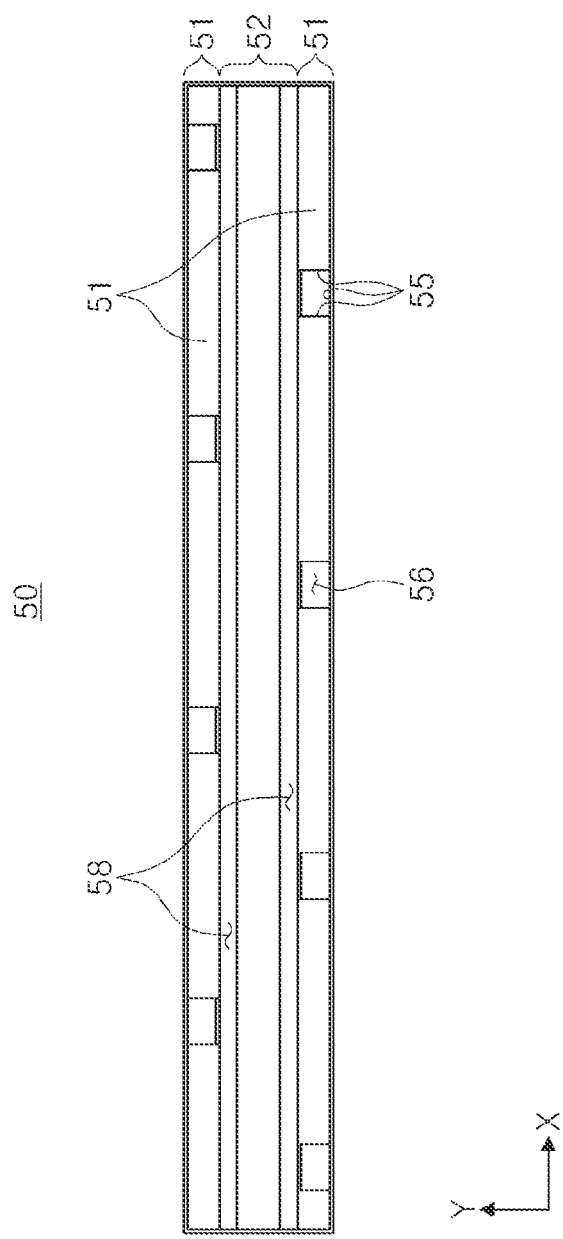
FIG. 5 is a plan view of a protective cover illustrated in FIG. 4.
Figure 6:
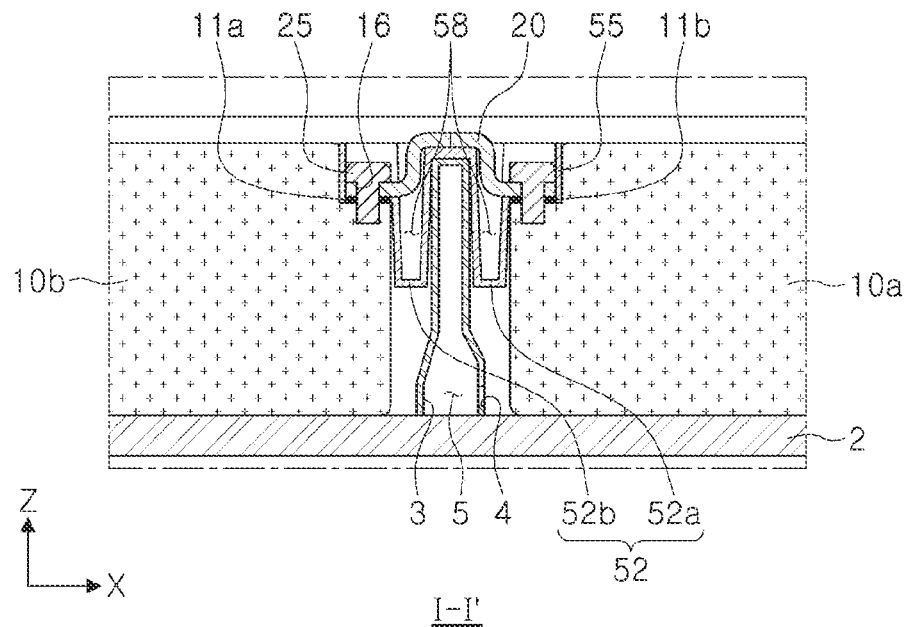
FIG. 6 is a cross-sectional view taken along line I-I' of FIG. 1.

In the drawings shown in FIGS. 1-7, the illustrated example of one embodiment of the battery pack case 2 includes a bottom plate (as shown in FIG. 6) over which the battery modules 10 are placed and supported and sidewalls (as shown in FIGS. 1 and 2) to enclose sides of the battery modules 10 so that the bottom place and the sidewalls of the battery pack case 2 collectively form a space for holding the battery modules 10 by enclosing the side and lower portions of the battery modules 10. In other embodiments and their implementations, the battery pack case 2 may be structured in various configurations to either partially enclose or surround part of the side, upper and lower portions of the battery modules 10 (such as the example shown in FIGS. 1, 2 and 6) or fully encloses or surrounds the entire battery modules 10.

The battery pack case 2 may include a metal material or another suitable material with a desired material for holding and securing battery modules 10 in place.

Each battery module 10 may include a secondary battery (storage battery or rechargeable battery) such as a lithium secondary battery or a nickel-hydrogen secondary battery that can be recharged to store electrical energy and discharge the stored electricity when the battery pack 1 is operated to supply electricity. Each battery module 10 may be designed and constructed to have a hexahedral shape in some implementations (e.g., a generally rectangular cuboid shape as shown in FIGS. 1 and 2) and other suitable battery module shapes may also be used. Each battery module 10 may include at least one conductive terminal 11 located at one side and exposed to the outside of the battery module 10 to connect a load or charger to internal elements of the battery module 10 such as one or more electrochemical cells in the battery module 10.

In some embodiments of the disclosed technology, the terminal 11 may be disposed parallel to the bottom surface of the battery module 10 in the battery pack case 2. In one example, the terminal 11 is disposed at one end of the battery module such that the upper surface of the terminal 11 is exposed to the outside of the battery module 10.

Examples of the terminal 11 for each battery module 10 as an electrical connection may include an electrically positive terminal and an electrically negative terminal that are spatially separate and electrically insulated from each other. In one example, both the positive terminal and the negative terminal may be disposed on one side of the battery module 10. In another example, the positive terminal is disposed at one side of the battery module 10 and the negative terminal is disposed on the other and opposite side of the battery module 10.

In some embodiments of the disclosed technology, the terminal 11 includes an electrically conductive material which may be shaped to include a flat plate. In other embodiments of the disclosed technology, the shape of the terminal 11 may vary depending on where and in what shape the bus bar 20 and the protective cover 50 are formed. For example, the terminal 11 has a shape that can facilitate the connection between the terminal 11 and other components such as the bus bar 20 and the protective cover 50.

The bus bar 20 may be coupled to the terminal 11. To this end, the terminal 11 may include a coupling hole 16 into which a bus bar fastening member 25 (see FIG. 4) is inserted.

In some implementations, the bus bar fastening member 25 may include a fastener such as a bolt or a screw. In one example, the bus bar fastening member 25 may sequentially pass through the bus bar 20 and the terminal 11 to fasten the bus bar 20 to the terminal 11. Accordingly, the bus bar 20 may be electrically and/or physically connected to the terminal 11 by the bus bar fastening member 25.

In some embodiments of the disclosed technology, the battery pack 1 may include the battery pack case 2 structured to support the plurality of battery modules 10. The plurality of battery modules 10 may be arranged in rows and columns in the battery pack case 2.

In addition, the battery pack case 2 implemented based on some embodiments of the disclosed technology may include a reinforcing frame 3 disposed between adjacent rows formed by the battery modules 10.

The reinforcing frame 3 may include a structure that reinforces the rigidity of the battery pack case 2. The reinforcing frame 3 may be disposed to partition a space into sections in which the battery modules 10 are disposed, and may be disposed along a boundary between the two battery modules 10 spaced apart from each other by a predetermined distance.

FIG. 6 is a cross-sectional view taken along line I-I' of FIG. 1. Referring to FIG. 6 together with FIG. 2, the reinforcing frame 3 may be disposed between adjacent battery modules 10 such that the reinforcing frame 3 functions as a barrier wall to separate adjacent battery modules 10. In some implementations, the reinforcing frame 3 may extend below the protective cover 50 as will be discussed below.

In some implementations, the reinforcing frame 3 may be formed as a cross-bar like structure extending from one inner side of the battery pack case 2 to the opposite inner side to strengthen or reinforce the structure of the battery pack case 2. As shown in FIG. 2, different reinforcing frames 3 may be placed at different locations inside the battery pack case 2 to reinforce the structure of the battery pack case 2 and to divide the inner space of the battery pack case 2 into different segments for placing battery modules 10. In the example in FIG. 2, reinforcing frames 3 are placed parallel to the X direction to divide the inner space into several segments along the Y direction so each segment holds a single back of battery modules 10 along the X direction. In some implementations, each reinforcing frame 3 may be structured to enclose or include an empty space or hollow interior inside the reinforcing frame 3 as shown in the cross sectional view in FIG. 6. The inner space of the reinforcing frame 3 may be used as a gas flow path 5 to allow for an air or gas flow to pass through the hollow interior. In one example, the gas flow path 5 may be used as a gas passage for discharging gas from the battery modules 10 to the outside of the battery pack 1 upon occurrence of thermal runaway in the battery modules 10. In some implementations, the reinforcing frame 3 may be structured to include one or more vent holes 4 through which the gas flows into the gas flow path 5, and the gas flow path 5 may be connected to the outside of the battery pack case 2.

In some embodiments of the disclosed technology, the vent hole 4 may include a through-hole connecting the gas flow path 5 to an external space of the reinforcing frame 3 and facing each battery module 10. However, the structure and location of the vent hole 4 is not limited to the above example.

Figure 3:
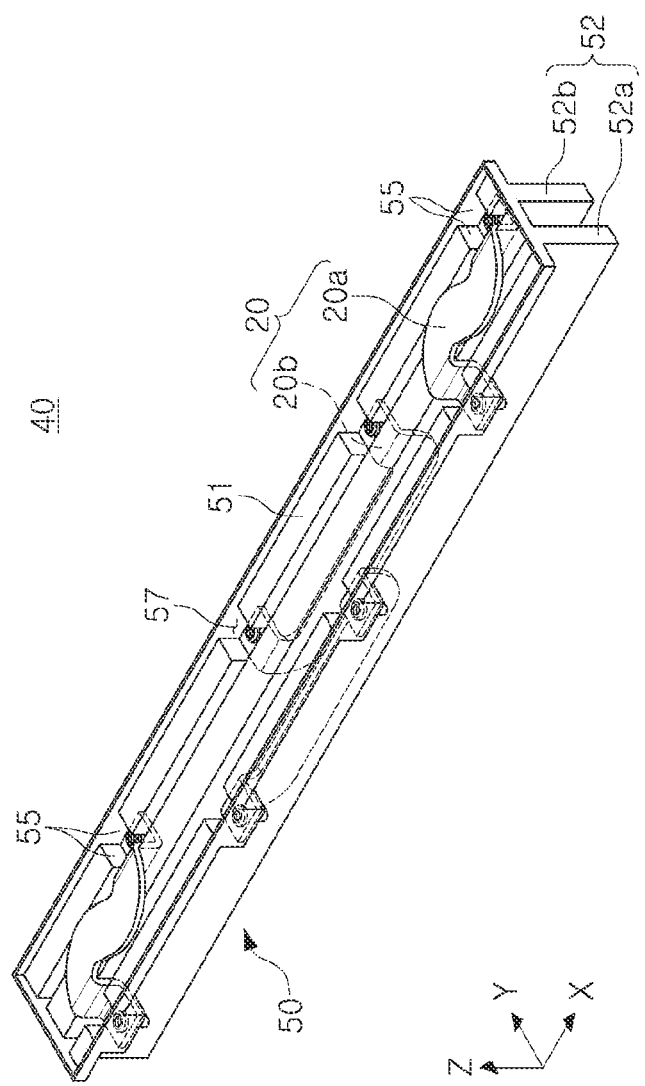
FIG. 3 is an enlarged perspective view of an example of a bus bar assembly illustrated in FIG. 1.

FIG. 3 is an enlarged perspective view of an example of the bus bar assembly 40 and the protective cover 50 illustrated in FIG. 2, FIG. 4 is an exploded perspective view of FIG. 3, and FIG. 5 is a plan view of the protective cover 50 illustrated in FIG. 4.

Referring to FIGS. 3 and 5 together, the battery pack 1 implemented based on some embodiments of the disclosed technology may include a bus bar assembly 40 that includes the bus bar 20 and the protective cover 50. In the depicted example, bus bar assembly 40 physically separates and electrically connects battery modules 10 in two adjacent rows of battery modules.

The bus bar 20 may connect a terminal 11 of a battery module 10*a* (hereinafter, referred to as a first battery module) to another terminal 11 of another neighboring battery module 10*b* (hereinafter, referred to as a second battery module). For example, one end of the bus bar 20 is in contact with a terminal 11*b* of the first battery module 10*a* and another end of the bus bar 20 is in contact with a terminal 11*a* of the neighboring second battery module 10*b* to electrically and/or physically connect the terminals 11*a* and 11*b* to each other. The bus bar 20 may be connected the positive or negative terminal of each battery module 10*a* or 10*b*.

The bus bar 20 implemented based on some embodiments of the disclosed technology may be formed by processing a flat rod-shaped conductive member. When the bus bar 20 is coupled to the terminal 11, a lower surface of the bus bar 20 may be disposed to be in surface contact with the terminal 11, and an upper surface thereof may be disposed to face the outside of the battery module 10.

The battery modules 10 implemented based on some embodiments of the disclosed technology may be connected in series or in parallel through the bus bar 20. In one example, some of the battery modules 10 are connected in series and some are connected in parallel through the bus bar 20, and various modifications are possible.

The bus bar 20 may include a flexible conductive material. However, the electrical and mechanical features of the bus bar 20 are not limited thereto.

In some embodiments of the disclosed technology, the bus bar 20 may be mounted or seated on and supported by the protective cover 50 and coupled to the terminal 11. In the examples shown in the drawings, protective covers 50 are respectively coupled to corresponding reinforcing frames 3 to cover part of each battery module 10 and part of each reinforcing frame 3 to provide separation and insulation between battery modules 10, including, for example, different groups of battery modules 10 in different subspaces on two opposite sides of each reinforcing frame 3.

In some implementations, the protective cover 50 may be an electrically insulating structure to prevent potential short circuits and fires in the event of thermal runaway in battery modules 10. For example, when thermal runaway occurs in a certain battery module 10, conductive particles ejected from the battery module 10 may come into contact with the bus bar 20 or other structures, short circuits may occur in the internal circuit of the battery pack 1. In addition, a flame may occur due to the thermal runaway. In such a case, the protective cover 50 may prevent the flame from spreading to other adjacent battery modules 10. To this end, at least a portion of the protective cover 50 implemented based on some embodiments of the disclosed technology may be disposed between the bus bar 20 and the battery module 10, and at least a portion thereof may be disposed on the battery module 10.

In some implementations, the protective cover 50 may be mounted on and supported by at least two battery modules 10*a* and 10*b* spaced apart from each other by a predetermined distance, and the bus bar 20 may be mounted on and supported by the protective cover 50 and may be coupled to the terminal 11 of the battery module 10.

FIGS. 3, 4 and 5 show some structural details of a specific example of the protective cover 50 based on some embodiments of the disclosed technology. The protective cover 50 in this illustrated example may include an extended portion 51 that is mounted on supported by at least a portion of the battery module 10, and a blocking portion 52 extending from the extended portion 51 and arranged outside of the battery module 10.

The extended portion 51 includes a portion that is supported by and/or in contact with the battery module 10. Therefore, the extended portion 51 is not limited to the shape illustrated in FIG. 3 as long as it has a structure that may be supported by the battery module 10, and thus the extended portion 51 may have various shapes.

In some implementations, the protective cover 50 may include a terminal coupling portion 56 that includes a through-hole exposing part of the terminal 11 when the terminal 11 is connected to the extended portion 51.

When the protective cover 50 is mounted on the battery module 10 by placing the extended portion 51 on a portion of the battery module 10, the terminal 11 of the battery module 10 may be exposed to the outside of the protective cover 50 through the terminal coupling portion 56 (e.g., a through-hole of the terminal coupling portion 56). Accordingly, after the bus bar 20 is placed in the terminal coupling portion 56 over the terminal 11, the bus bar 20 may be fastened to the terminal 11 through a bus bar fastening member 25.

In some embodiments of the disclosed technology, the terminal coupling portion 56 may be formed as an opening such that the terminal 11 fits in the opening. In one example, the terminal coupling portion 56 may include a quadrangular opening. However, the structure of the terminal coupling portion 56 and the shape of the opening are not limited thereto. In some implementations, the terminal coupling portion 56 may be formed as a conductive member and may include a structure that connects the bus bar 20 and the terminal 11 to each other via an opening of the terminal coupling portion 56.

A guide portion 55 may be disposed around the terminal coupling portion 56. The guide portion 55 may include one or more sidewall arranged along sides of the terminal coupling portion 56. In one example, the guide portion 55 may include a sidewall surrounding the terminal coupling portion 56 along the contour of the terminal coupling portion 56. In some implementations, the protective cover 50 may include a receiving part 57 that includes a space defined by the terminal coupling portion 56 and the guide portion 55.

In some implementations, the guide portion 55 may include three sides of the terminal coupling portion 56, out of four sides of the terminal coupling portion 56. In one example, the bus bar 20 extends to the remaining side of the terminal coupling portion 56.

In some embodiments of the disclosed technology, at least a portion of the guide portion 55 may block connection between the battery module 10 and the bus bar 20 so that the bus bar 20 only contacts the terminal 11 of the battery module 10 and does not directly face or contact other parts of the battery module 10 due to the guide portion 55.

In some implementations, the blocking portion 52 may extend from the extended portion 51 and is situated outside of the battery modules 10. Accordingly, the battery module 10 is not disposed below the blocking portion 52.

In one example, as illustrated in FIG. 6, the blocking portion 52 is structured to function as a barrier wall between the terminal 11*b* of the first battery module 10*a* and the terminal 11*a* of the second battery module 10*b*. Accordingly, the blocking portion 52 as the barrier wall can block gas or conductive particles ejected from one battery module 10 from flowing to another battery module 10.

In general, a resin material may be formed outside the terminal 11 of the battery module 10 for insulation purposes. However, such a resin material is vulnerable to heat. Therefore, when thermal runaway or flame occurs in the battery module 10, gas and conductive particles may be emitted to the outside of the battery module 10 through the periphery of the terminal 11.

The blocking portion 52 implemented based on some embodiments of the disclosed technology may block the movement of gas or conductive particles emitted from the vicinity of the terminal 11 as described above and suppress diffusion of the gas or conductive particles. To this end, the blocking portion 52 may be disposed to face the side of the battery module 10 on which the terminal 11 is disposed. Also, the blocking portion 52 may have an area extending upwardly and downwardly from the position in which the terminal 11 is disposed.

In some implementations, the protective cover 50 may be configured so that its blocking portion 52 may include an insulating section disposed between the reinforcing frame 3 and the battery module 10. For example, the blocking portion 52 may include a first blocking portion 52a and a second blocking portion 52b that are separate from each other with a gap in which the reinforcing frame 3 is positioned so that the first blocking portion 52a is disposed between the first battery module 10a and the reinforcing frame 3, and the second blocking portion 52b is disposed between the second battery module 10b and the reinforcing frame 3. In this case, the reinforcing frame 3 may be inserted into the gap between the first blocking portion 52a and the second blocking portion 52b, and thus the protective cover 50 may be attached or fitted to the reinforcing frame 3.

Under the above design of the protective cover 50, since the protective cover 50 is coupled to the reinforcing frame 3, the protective cover 50 may be more stably engaged to and supported by the battery module 10.

In an embodiment of the disclosed technology, the first blocking portion 52a and the second blocking portion 52b may extend in the longitudinal direction of the reinforcing frame 3. In another embodiment of the disclosed technology, at least one of the first blocking portion 52a and the second blocking portion 52b may include a plurality of divided portions (not illustrated) coupled to the reinforcing frame 3.

Examples of the bus bar 20 based on some embodiments of the disclosed technology may include a high-voltage bus bar that electrically connects the battery modules 10 to each other. In addition, one protective cover 50 may include a first extended portion 51a mounted on the first battery module 10a and a second extended portion 51b mounted on the second battery module 10b.

Accordingly, two or more terminal coupling portions 56 may be provided on one protective cover 50, and both ends of one bus bar 20 may be disposed on different terminal coupling portions 56 and be coupled to terminals 11 of different battery modules 10, respectively.

When the bus bar 20 is mounted on the protective cover 50, both ends of the bus bar 20 are positioned on different terminal coupling portions 56, respectively, such that both ends of the bus bar 20 may be disposed in different receiving parts 57.

In examples of the embodiment of the disclosed technology as illustrated in the drawings, the bus bars 20 are disposed on the protective cover 50 and are structured to connect neighboring battery modules 10. In one example for a specific implementation as shown in drawings, the bus bar 20 may include a first bus bar 20a and a second bus bar 20b as shown in FIGS. 3 and 4 where FIG. 4 shows an exploded view to illustrate how the first bus bar 20a and the second bus bar 20b are shaped to include extended flat connectors with through holes for engaging terminals of battery modules 10 by using a screw to secure the electrical and mechanical connections with the battery module terminals. Notably, in the illustrated examples, the batter modules 10 are arranged as a 2-dimensional module array along the X and Y directions as shown by the XYZ coordinates in FIGS. 2, 3 and 4. In this specific example, the first bus bar 20a is designed to connect neighboring battery modules along the Y direction (e.g., neighboring battery modules 10a and 10b in FIG. 2) and the second bus bar 20b is designed to connect neighboring battery modules along the X direction (e.g., neighboring battery modules 10a, 10c and 10d in FIG. 2). Therefore, with the first bus bar 20a and second bus bar 20b, the bus bar 20 can provide connections between neighboring battery modules in both X and Y directions and different bus bars 20 are distributed at different locations to collectively connect the battery modules 10 in the battery pack 1.

The first bus bar 20a may connect the first battery module 10a and the second battery module 10b disposed in such a manner that side surfaces on which the terminals 11 are disposed face each other.

Accordingly, both ends of the first bus bar 20a may be disposed in the receiving part 57 of the first extended portion 51a and the receiving part 57 of the second extended portion 51b, respectively.

Also, as described above, since the reinforcing frame 3 is disposed between the first battery module 10a and the second battery module 10b, the first bus bar 20a may traverse an upper portion of the protective cover 50 over the blocking portion 52 coupled to the reinforcing frame 3.

As illustrated in FIG. 3, when both ends of the first bus bar 20a are disposed on different extended portions 51a and 51b respectively, the position or movement of the first bus bar 20a in the horizontal direction (X, Y-axis directions) may be restricted by the guide portion 55.

Therefore, even when a plurality of bus bars 20 are mounted on the protective cover 50 without a separate fixing member, the bus bars 20 are not easily separated from the protective cover 50 in the process of transporting the protective cover 50, and the structural stability of the bus bars 20 coupled to the protective cover 50 may be maintained.

The second bus bar 20b may connect a third battery module 10c and a fourth battery module 10d that are disposed side by side.

To provide a space in which at least a portion of the second bus bar 20b is disposed, the blocking portion 52 implemented based on some embodiments of the disclosed technology may include a bus bar insertion portion 58. The bus bar insertion portion 58 includes an inner space such as a groove in the blocking portion 52 that is open upwardly.

Figure 7:
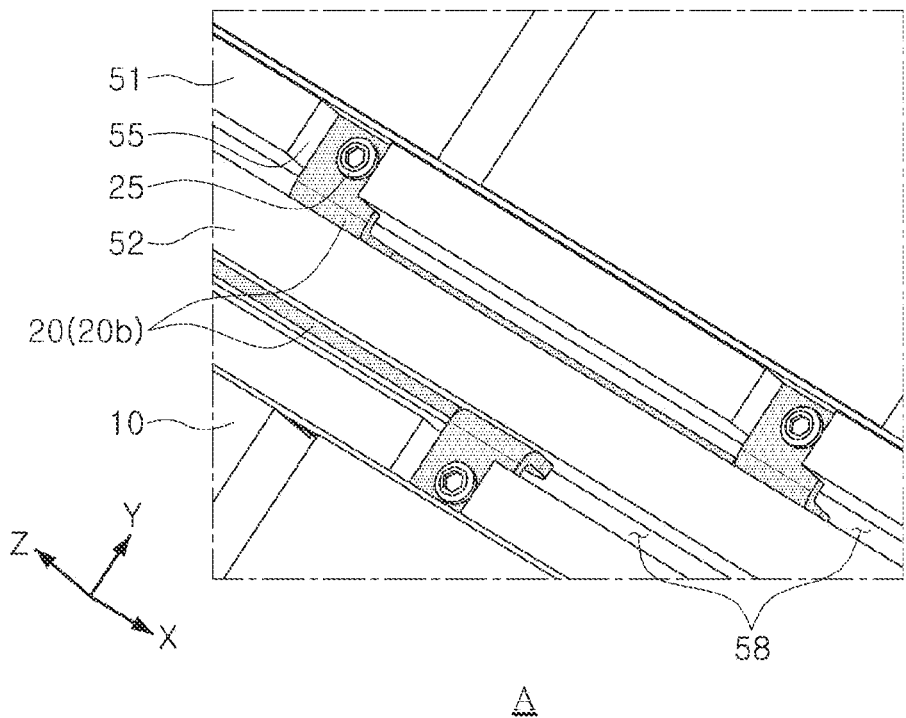
FIG. 7 is an enlarged perspective view of part A of FIG. 2.

FIG. 7 is an enlarged perspective view of part A of FIG. 2. Referring to FIG. 2 together with FIG. 7, at least a portion of the second bus bar 20b is inserted into and disposed in the bus bar insertion portion 58 of the blocking portion 52.

In an implementation where the blocking portion 52 is formed to have the form of a barrier wall, the bus bar insertion portion 58 may be formed as a slit-shaped groove. Therefore, when the second bus bar 20b is inserted into the bus bar insertion portion 58, the movement of the bus bar 20 in the Y-axis direction may be restricted by the bus bar insertion portion 58. Accordingly, even when both ends of the second bus bar 20b are mounted on one extended portion 51, the position or movement of the bus bar 20 in the horizontal direction (X, Y-axis direction) may be suppressed, improving the structural stability of the bus bar 20.

The protective cover 50 based on some embodiments of the disclosed technology may be formed of a material having electrically insulating properties, such as resin materials and other electrically insulating materials. The material for the protective cover 50 may include a material having heat resistance performance capable of maintaining a shape at a relatively high temperature. For example, the protective cover 50 may be formed of a resin material or a fiber composite material having heat resistance performance of about 150° C. or higher.

In addition, the protective cover 50 may include a flame-retardant material, a non-combustible material, or a fire-resisting insulating material to withstand the flame emitted from the battery module 10. For example, the protective cover 50 may include a silicone or mica material. In addition, on a surface of the protective cover 50 facing the battery module 10 from among the surfaces of the protective cover 50, a resin or a fiber composite material coated with silicone or mica on a surface thereof may be used.

The battery pack 1 based on some embodiments of the disclosed technology may be manufactured by disposing the battery modules 10 in the battery pack case 2 and then fastening the bus bar assemblies 40 to the battery modules 10.

The process of fastening the bus bar assembly 40 to the battery module 10 may include disposing the bus bar 20 on the protective cover 50, and disposing the protective cover 50 on which the bus bar 20 is mounted, on the battery module 10, and coupling the bus bar 20 to the terminal 11.

The disposing of the bus bar 20 on the protective cover 50 may include disposing both ends of the bus bar 20 in the receiving part 57 such that the bus bar 20 is supported by the protective cover 50. As described above, a plurality of bus bars 20 may be spaced apart from each other and may be mounted on one protective cover 50, and the protective cover 50 may be placed on the battery modules 10, with the plurality of bus bars 20 mounted on the protective cover 50.

The disposing of the protective cover 50 on the battery module 10 may include coupling the protective cover 50 to the reinforcing frame 3 provided in the battery pack case 2. Since the extended portion 51 of the protective cover 50 is disposed on the battery module 10, the protective cover 50 is supported by the reinforcing frame 3 and the battery module 10, improving the structural stability of the protective cover 50 on the battery module 10.

When the protective cover 50 is mounted on the battery module 10, the terminal 11 of the battery module 10 is exposed to the outside of the protective cover 50 through the terminal coupling portion 56 of the protective cover 50 and is in surface contact with the bus bar 20 disposed in the receiving part 57.

Thereafter, the bus bar 20 may be attached to the battery module 10 by fastening the bus bar 20 to the terminal 11 using the bus bar fastening member 25.

As such, in the battery pack manufacturing method based on some embodiments of the disclosed technology, the bus bar assembly 40, in which the plurality of bus bars 20 are mounted on one protective cover 50, is mounted on the plurality of battery modules 10, and then, each bus bar 20 is fastened to the terminals 11. Therefore, the plurality of bus bars 20 may be arranged on the battery modules 10 by simply mounting the bus bar assembly 40 on the battery modules 10. As such, the manufacturing can be optimized in a way that can reduce costs and manufacturing time, compared to installing the bus bars 20 to the battery modules 10 one by one. In addition, the disclosed technology can be implemented in some embodiments to facilitate production automation.

In another embodiment of the disclosed technology, the protective cover 50 and the bus bar 20 may be incorporated into the bus bar assembly 40 through an insert injection molding method or others. When using the bus bar assembly 40 into which the protective cover 50 and the bus bar 20 are incorporated by the injection molding method, the bus bar assembly 40 is mounted on the reinforcing frame 3, and then, a coupling location between the bus bar 20 and the terminal 11 may be adjusted. Therefore, it is possible to reduce or minimize the time it takes to fasten the bus bars 20 to the terminals 11.

The battery pack implemented based on some embodiments of the disclosed technology includes a protective cover to avoid additional damage when thermal runaway occurs in the battery pack.

When thermal runaway occurs in a battery pack that does not have a protective cover, conductive particles emitted from a battery module may be attached to other battery modules or surrounding structures to cause short circuits.

The disclosed technology can be implemented in some embodiments to provide the battery pack that includes a protective cover. Therefore, even when thermal runaway or flame occurs in the battery module, the movement of gas or conductive particles ejected from the battery module is blocked by the protective cover, thereby preventing short circuits that would have occurred due to the conductive particles.

In addition, the structural collapse of the battery module during the thermal runaway process may cause the bus bar to move and come into contact with conductive structures such as a case of the battery module, a battery pack case, and a reinforcing frame. In this case, additional fire or explosion may also occur due to short circuits.

However, in the battery pack based on some embodiments of the disclosed technology, a protective cover is disposed between the battery module and the bus bar, and a protective cover is mounted on a plurality of battery modules. Therefore, even in a case in which a lower portion of a specific bus bar is collapsed, since the protective cover is supported by another battery module, movement of the bus bars mounted on the protective cover may be suppressed.

Accordingly, it is possible to prevent the bus bar from coming into contact with the battery pack case or surrounding structures, thereby preventing an additional problem from occurring due to short circuits.

As set forth above, based on some embodiments of the disclosed technology, in a case in which thermal runaway occurs in a battery module, a short circuit may be prevented from occurring in an internal circuit of a battery pack due to gas or conductive particles. In addition, a bus bar fastening process of electrically connecting terminals of neighboring battery modules may be simplified.

While this patent document includes specific examples, these should not be construed as limitations on the scope of any invention or of what may be claimed, but rather as descriptions of features that may be specific to particular embodiments of the technology. Descriptions of various features or aspects in one of the disclosed examples may be applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Improvements, enhancements or variations of the disclosed embodiments or implementations and other embodiments or implementations may be made based on what is disclosed or illustrated in this patent document.

What is claimed is:

1. A battery pack comprising:
a plurality of battery modules;
a battery pack case engaged to hold the plurality of battery modules and structured to provide an accommodating space in which the plurality of battery modules are accommodated, wherein the battery pack case includes one or more reinforcing frames structured to partition the accommodating space into subspaces in which the plurality of battery modules are held;
one or more protective covers respectively coupled to the one or more reinforcing frames to cover part of each battery module and part of each reinforcing frame; and
one or more bus bars coupled to the one or more protective covers and structured to electrically connect the plurality of battery modules,
wherein the one or more protective covers include a protective cover that is mounted on and supported by neighboring battery modules,
wherein the protective cover comprises:
an extended portion supported by at least two of the plurality of battery modules; and
a blocking portion extending from the extended portion and disposed outside of the plurality of battery modules, wherein the blocking portion extends toward a corresponding reinforcing frame.

2. The battery pack of claim 1, wherein the protective cover includes a portion supported by the neighboring battery modules associated with the protective cover, and at least a portion of the protective cover is disposed between a bus bar associated with the protective cover and of the neighboring battery modules.

3. The battery pack of claim 1, wherein the bus bar is disposed on the protective cover, and
both ends of the bus bar are fastened to terminals of the plurality of battery modules through a terminal coupling portion disposed on the protective cover.

4. The battery pack of claim 1, wherein the blocking portion has an internal space that includes a groove with an open top.

5. The battery pack of claim 4, wherein the bus bar includes a portion that is structured to be inserted into the internal space of the blocking portion.

6. The battery pack of claim 1, wherein the plurality of battery modules comprises a first battery module and a second battery module spaced apart from each other,
the extended portion comprises a first extended portion supported by the first battery module and a second extended portion supported by the second battery module, and
the blocking portion is disposed between the first battery module and the second battery module and connects the first extended portion and the second extended portion.

7. The battery pack of claim 6, wherein the blocking portion includes a barrier wall structured to block connection between a terminal of the first battery module and a terminal of the second battery module.

8. The battery pack of claim 7, wherein the blocking portion comprises:
a first blocking portion disposed between the first battery module and the reinforcing frame; and
a second blocking portion disposed between the second battery module and the reinforcing frame.

9. The battery pack of claim 7, wherein the reinforcing frame comprises:
a gas flow path disposed in the reinforcing frame; and
a vent hole structured to direct gas generated from the battery module into the gas flow path.

10. The battery pack of claim 1, wherein the protective cover comprises:
a terminal coupling portion structured to support the bus bar coupled to terminals of the plurality of battery modules.

11. The battery pack of claim 10, wherein the protective cover and the bus bar are incorporated into a bus bar assembly.

12. The battery pack of claim 1, wherein the protective cover comprises a guide portion disposed to surround ends of the bus bar coupled to terminals of the plurality of battery modules.

13. The battery pack of claim 1, wherein the protective cover includes at least one of a resin material or a fiber composite material having heat resistance of 150° C. or higher.

14. A battery pack comprising:
a plurality of battery modules including a first battery module and a second battery module, each of the first battery module and the second battery module including a plurality of terminals;
a bus bar coupled to connect the first and second battery modules via the plurality of terminals provided on the first and second battery modules; and
a protective cover structured to include one or more portions disposed between the bus bar and the first battery module and between the bus bar and the second battery module,
wherein the protective cover includes portions that extend to and are mounted on and supported by the first and second battery modules, and includes a terminal coupling portion through which the bus bar is connected to the terminals of the first and second battery modules,
wherein the protective cover comprises:
an extended portion supported by the first and second battery modules; and
a blocking portion extending from the extended portion and disposed outside of the first and second battery modules, wherein the blocking portion extends toward a corresponding reinforcing frame.

15. The battery pack of claim 14, wherein the blocking portion includes a first blocking portion and a second blocking portion structured to support a first extended portion and a second extended portion and create a groove between the first blocking portion and the second blocking portion.

16. A battery pack, comprising:
a battery pack case including a bottom plate and side walls to form a battery holding space and reinforcing frames between two opposing sidewalls to divide battery holding space into segments and to reinforce a structure of the battery holding space;
battery modules placed in the segments of the battery holding space of the battery pack case;
protective covers engaged to the reinforcing frames, respectively, each of the protective covers structured to be electrically insulating; and
a plurality of bus bars engaged to the protective covers to provide electrical connections to the battery modules for outputting stored electricity and for receiving input electrical power to recharge the battery modules, wherein each of the protective covers is mounted on and supported by at least two battery modules, wherein each of the protective covers comprises:

an extended portion supported by at least two of the battery modules; and a blocking portion extending from the extended portion and disposed outside of the battery modules, wherein the blocking portion extends toward a corresponding reinforcing frame.

17. The battery pack as in claim 16, wherein each reinforcing frame is structured to include a hollow interior and a vent hole to allow for passage of a gas flow.

18. The battery pack as in claim 16, wherein the plurality of busbars include first bus bars for providing electrical connections between two battery modules on opposite sides of each reinforcing frame and second bus bars for providing electrical connections between two neighboring battery modules on a common side of each reinforcing frame.

* * * * *